United States Patent [19]

Oka et al.

[11] Patent Number: 4,696,989

[45] Date of Patent: Sep. 29, 1987

[54] FLUORINE-CONTAINING ELASTOMERIC COPOLYMER

[75] Inventors: Masahiko Oka, Shiga; Yutaka Ueta; Hideo Kano, both of Osaka; Masayasu Tomoda, Shiga; Shoji Kawachi, Hyogo, all of Japan

[73] Assignee: Daikin Industries, Ltd., Osaka, Japan

[21] Appl. No.: 849,734

[22] Filed: Apr. 9, 1986

[30] Foreign Application Priority Data

Apr. 10, 1985 [JP] Japan ................................. 60-77097

[51] Int. Cl.$^4$ ...................... C08F 14/18; C08F 14/22; C08F 14/28
[52] U.S. Cl. ...................................... 526/254; 526/255
[58] Field of Search ................................. 526/254, 255

[56] References Cited

U.S. PATENT DOCUMENTS

| | | | |
|---|---|---|---|
| 2,968,649 | 1/1961 | Pailthorp | 526/254 |
| 4,335,238 | 6/1982 | Moore | 526/254 |

FOREIGN PATENT DOCUMENTS

| | | | |
|---|---|---|---|
| 0081213 | 5/1985 | Japan | 526/254 |
| 0203613 | 10/1985 | Japan | 526/254 |
| 888765 | 10/1959 | United Kingdom | 526/254 |

Primary Examiner—Paul R. Michl
Assistant Examiner—Peter D. Mulcahy
Attorney, Agent, or Firm—Birch, Stewart, Kolasch and Birch

[57] ABSTRACT

A copolymer comprising repeating units derived from tetrafluoroethylene, vinylidene fluoride and hexafluoropropylene in a molar ratio within an area defined on a tetrafluoroethylene, vinylidene fluoride and hexafluoropropylene ternary composition diagram by a hexagon with its first vertex A at 34.0% by weight of tetrafluoroethylene, 8.5% by weight of vinylidene fluoride and 57.5% by weight of hexafluoropropylene; its second vertex B at 26.5% by weight of tetrafluoroethylene, 14.5% by weight of vinylidene fluoride and 59.0% by weight of hexafluoropropylene; its third vertex C at 31.0% by weight of tetrafluoroethylene, 24.0% by weight of vinylidene fluoride and 45.0% by weight of hexafluoropropylene; its fourth vertex D at 49.0% by weight of tetrafluoroethylene, 26.5% by weight of vinylidene fluoride and 24.5% by weight of hexafluoropropylene; its fifth vertex E at 49.0% by weight of tetrafluoroethylene, 11.0% by weight of vinylidene fluoride and 40.0% by weight of hexafluoropropylene; and its sixth vertex F at 50.0% by weight of tetrafluoroethylene, 9.0% by weight of vinylidene fluoride and 41.0% by weight of hexafluoropropylene having not only good flexibility, heat resistance and flame retardance but also good insulating performance and moldability.

6 Claims, 1 Drawing Figure

Figure
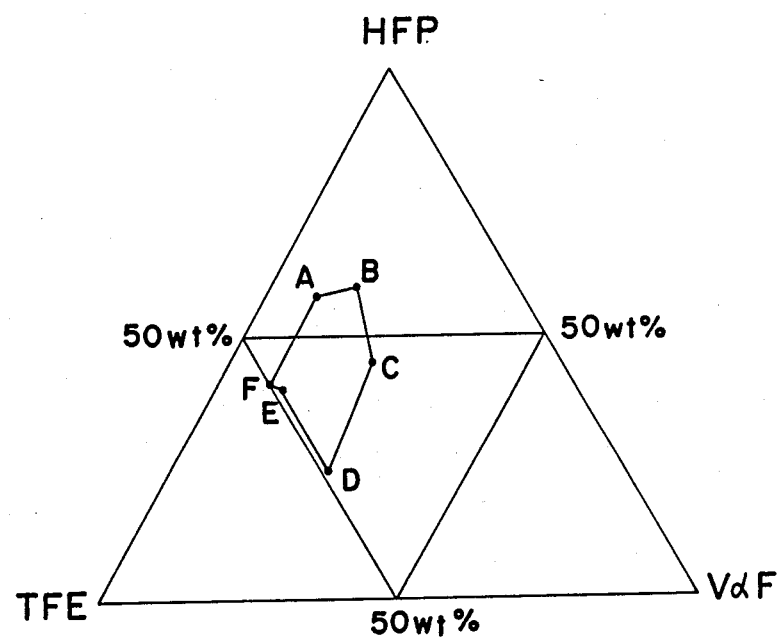

FLUORINE-CONTAINING ELASTOMERIC COPOLYMER

FIELD OF THE INVENTION

The present invention relates to a fluorine-containing elastomeric copolymer. More particularly, it relates to a fluorine-containing elastomeric copolymer comprising tetrafluoroethylene (hereinafter referred to as "TFE"), vinylidene fluoride (hereinafter referred to as "VdF") and hexafluoropropylene (hereinafter referred to as "HFP") and a wire coating material comprising the fluorine-containing elastomeric copolymer.

BACKGROUND OF THE INVENTION

An elastomeric copolymer comprising TFE, VdF and HFP is known to be a fluorine-containing elastomer having good heat, oil and chemical resistance and is used in various fields in the form of, for example, a gasket, a packing, a diaphragm and a tube. Furthermore, it is also proposed to use said copolymer as a wire coating material by virtue of its good flexibility, heat resistance and flame retardance.

Since the conventional TFE/VdF/HFP elastomeric copolymer has inferior insulating performance or poor moldability, it is not practically used as a wire coating material.

SUMMARY OF THE INVENTION

One object of the present invention is to provide a TFE/VdF/HFP copolymer having good insulating performance.

Another object of the present invention is to provide a TFE/VdF/HFP copolymer having good moldability.

Further object of the present invention is to provide a TFE/VdF/HFP copolymer having good insulating performance, good moldability, heat resistance, flame retardance and flexibility which is useful as a wire coating material.

These and other objects are accomplished by a TFE/VdF/HFP copolymer of the invention which comprises repeating units derived from TFE, VdF and HFP in a molar ratio within an area defined on a TFE, VdF and HFP ternary composition diagram by hexagon with its first vertex A at 34.0% by weight of TFE, 8.5% by weight of VdF and 57.5% by weight of HFP; its second vertex B at 26.5% by weight of TFE, 14.5% by weight of VdF and 59.0% by weight of HFP; its third vertex C at 31.0% by weight of TFE, 24.0% by weight of VdF and 45.0% by weight of HFP; its fourth vertex D at 49.0% by weight of TFE, 26.5% by weight of VdF and 24.5% by weight of HFP; its fifth vertex E at 49.0% by weight of TFE, 11.0% by weight of VdF and 40.0% by weight of HFP; and its sixth vertex F at 50.0% by weight of TFE, 9.0% by weight of VdF and 41.0% by weight of HFP (cf. Figure).

BRIEF DESCRIPTION OF THE DRAWING

The figure is a TFE, VdF and HFP ternary composition diagram.

DETAILED DESCRIPTION OF THE INVENTION

The TFE/VdF/HFP copolymer has the composition within the hexagon ABCDEF in Figure and has volume resistivity of at least $10^{15}$ ohm.cm, while the conventional TFE/VdF/HFP copolymer has volume resistivity of $10^{11}$ to $10^{14}$ ohm.cm. In addition, the TFE/VdF/HFP copolymer of the invention has good moldability. Therefore, it is desirable as a wire coating material.

When the content of TFE is too large, flexibility and moldability of the copolymer tend to be deteriorated. When it is too small, the insulating performance of the copolymer is not sufficient. The copolymer containing TFE in such a larger amount is disclosed in Japanese Patent Kokai Publication (unexamined) No. 22084/1977 corresponding to French Patent No. 2,320,317 and DE-OS No. 2635402. Such a copolymer is a vulcanizable plastic fluoropolymer but does not have enough elasticity to be commercially used so that it is not suitable for coating electric wires.

When the content of VdF is too large, the insulating performance is not satisfactory. When it is too small, flexibility and moldability of the copolymer are deteriorated.

HFP is an important monomer to impart flexibility to the copolymer. Thus, if its content is too small, the copolymer tends to have poor flexibility. However, if its content is too large, the polymerization rate is considerably lower and productivity of the copolymer is undesirably decreased.

In general, the copolymer of the invention has a number average molecular weight of 20,000 to 100,000. It can be produced by a conventional polymerization method including emulsion, suspension and bulk polymerization. The monomers may be charged batch wise or continuously to keep the molar ratio of the monomers constant in the reaction system.

The monomers are radically polymerized in the presence of a conventional polymerization initiator which is used in the production of the conventional TFE/VdF/HFP copolymer. Specific examples of the initiator are inorganic peroxides [for example, persulfates (e.g. ammonium persulfate), and a redox initiator (e.g. a combination of a persulfate, a reducing agent such as sodium sulfite and acid sodium sulfite, and optionally an accelerator such as ferrous sulfate, copper sulfate and silver nitrate]; organic peroxides [for example, diisopropyl peroxydicarbonate, isobutyryl peroxide, benzoyl peroxide, acetyl peroxide, and t-butyl hydroperoxide]; and fluorine-containing peroxides [for example, [Cl(CF$_2$CFCl)$_2$CF$_2$COO-]$_2$ and [H(CF$_2$CF$_2$)$_3$COO-]$_2$ and [ClCF$_2$CF$_2$COO-]$_2$].

In the emulsion polymerization, an alkali metal or ammonium salt of a compound of the formula:

$$X(CF_2)_nY \qquad (I)$$

wherein X is a hydrogen atom or a fluorine atom, Y is —COOH or —SO$_3$H, and n is a number of 5 to 12 is preferably used as an emulsifier in an amount of 0.1 to 5% by weight, preferably 0.5 to 2% by weight based on the weight of water.

In the suspension polymerization, usually water is used as a reaction medium. Optionally, a fluorocarbon is optionally added to water. Examples of the fluorocarbon are 1,1,2-trichloro-1,2,2-trifluoroethane, 1,2-dichloro-1,1,2,2-tetrafluoroethane, perfluorocyclobutane, dichlorodifluoromethane and trichlorofluoromethane.

The reaction temperature depends on the decomposition rate of the initiator. Usually, it is from about 0° to 150° C.

The reaction pressure depends on the reaction temperature and/or the polymerization mode. It is usually from about 0 to 50 kg/cm$^2$G.

Although the molecular weight of the copolymer may be controlled by suitably adjusting the relationship between the reaction rate and the amount of the initiator, it is easily adjusted by the addition of a chain transfer agent to the polymerization system. Examples of the chain transfer agent are $C_4$-$C_6$ hydrocarbons; alcohols; ethers; halogen-containing organic compounds (e.g. $CCl_4$, $CBrCl_3$, $CF_2BrCFBrCF_3$, and $CF_2I_2$). When an iodine-containing fluorocarbon (e.g. $CF_2I_2$, $I(CF_2)_4I$, $CF_2=CFCF_2CF_2I$ and $CF_2=CFOCF_2CF_2CH_2I$) is used as the chain transfer agent, an iodine atom is bonded at a chain end of the copolymer and still radically active. Therefore, the copolymer can be advantageously cross-linked with peroxide as a radical source in the presence of a polyfunctional unsaturated compound (e.g. triallylisocyanurate and triallylcyanurate).

In general, the elastomeric copolymer of the invention can be cured in the presence of at least one crosslinking source. A preferred example of the crosslinking source is an organic peroxide, although radioactive rays (e.g. alpha-ray, beta-ray, gamma-ray and X-ray) and a high energy electromagnetic wave (e.g. ultraviolet light) may be used as the cross-linking source.

When the organic peroxide is used as the crosslinking source, it is used in an amount of 0.05 to 10 parts by weight, preferably 1.0 to 5 parts by weight per 100 parts by weight of the copolymer.

The organic peroxide includes those easily generate a peroxy radical in the presence of heat energy or an oxidation-reduction system. Examples include 1,1-bis(t-butylperoxy)-3,5,5-trimethylcyclohexane, 2,5-dimethylhexane-2,5-dihydroperoxide, di-t-butylperoxide, t-butylcumylperoxide, dicumylperoxide, α,α'-bis(t-butylperoxy)-p-diisopropylbenzene, 2,5-dimethyl-2,5-di(t-butylperoxy)hexane, 2,5-dimethyl-2,5-(t-butylperoxy)-hexine-3, benzoylperoxide, t-butylperoxybenzene, 2,5-diemthyl-2,5-di(benzoylperoxy)hexane, t-butylperoxymaleic acid, t-butyl peroxyisopropyl carbonate and the like. Among them, the dialkyl type peroxides are preferred. The amount and type of the peroxide are selected according to the amount of active —O—O— groups and cross-linking conditions such as a decomposition temperature of the peroxide.

When the organic peroxide compound is used as the cross liking source, cross-linking is facilitated by the addition of a cross-linking coagent. As the cross-linking coagent, any of conventional ones may be used insofar as it is reactive with the peroxy radical and the polymer radical. Preferred examples are triallylcyanurate, triallylisocyanurate, triacrylformal, triallyltrimeritate, N,N'-m-phenylenebismaleimide, dipropargyl terephthalate, diallylphthalate, tetrallyl teraphthalamide, trially phosphate and the like. The amount of the cross-linking coagent is from 0.1 to 10 parts by weight, preferably from 0.5 to 5 parts by weight per 100 parts by weight of the copolymer to be cross-linked.

The copolymer of the invention may be blended and cocross-linked with at least one of other polymer. Examples of such cocross-linkable other polymers are silicone oil, silicone rubber, ethylene-vinyl acetate copolymer, poly-1,2-butadiene, fluorosilicone oil, fluorosilicone rubber, fulorophosphazene rubber, hexafluoropropylene-ethylene copolymer, tetrafluoroethylene-propylene copolymer and the like. Further, a polymer having radical reactivity may be blended and cocross-linked with the copolymer of the invention. The amount of the blended polymer may be such amount that the characteristic properties of the copolymer of the invention are not deteriorated.

The elastomeric copolymer of the invention may contain a pigment for coloring the product, a filler or a reinforcing material. Usually used filler or reinforcing material includes, as an inorganic material, carbon black, titanium oxide ($TiO_2$), silica, clay and talc, and as an organic material, fluorine-containing polymers (e.g. polytetrafluoroethylene, polyvinylidene fluoride, polyvinyl fluoride, polychlorotrifluoroethylene, tetrafluoroethylene-ethylene copolymer and tetrafluoroethylene-vinylidene fluoride copolymer).

The curing component may be blended in the copolymer of the invention by a suitable method depending on viscoelasticity and form of the materials to be blended. The powder materials are mixed by means of open rolls or a powder mixer, while the liquid materials are mixed by means of a conventional mixer. Further, the solid materials may be dispersed or dissolved in a solvent and mixed.

The cross-linking conditions depend on the type of the peroxide. In general, press cure is carried out at a temperature of 120° to 200° C. for 5 to 30 minutes, and oven cure is carried out at a temperature of 150° to 250° C. for 1 to 24 hours.

The elastomeric copolymer of the invention is particularly useful as a wire coating material since it has good moldability and insulating performance. In addition, since the copolymer of the invention contains fluorine in a larger amount than the conventional TFE/VdF/HFP copolymer, its solvent resistance, chemical resistance and non-tackiness are greatly improved. Thus, it is conveniently used in various fields where a material is required to have such properties. For example, the copolymer of the invention is used as a general molding material, a sealant, an adhesive, a coating material, a valve stem seal used in automobiles, a reed valve, a rubber seal ring used in a hydraulic device, rollers used in printing, weaving or paper industries, mixing rollers, tanks for mixing coating compositions, stirrers, belts for conveying rubbery or resinous articles, belts for printing, belts for high frequency heating, diaphragm and the like.

The present invention will be explained further in detail by following examples.

EXAMPLE 1

In a 3.1 liter reaction vessel, pure water (1 liter) and ammonium perfluorooctanoate (2 g) were charged. After replacing the interior atmosphere with nitrogen gas, HFP was injected to pressurize to 16 kg/cm$^2$G at 80° C. Then, a mixture of TFE, VdF and HFP in a molar ratio of 42:30:28 was injected to pressurize the interior to 20 kg/cm$^2$G. Thereafter, a solution of ammonium persulfate (0.01 g) in pure water (10 ml) was injected to initiate polymerization. As the reaction proceeded, the pressure dropped. When the pressure dropped to 19 kg/cm$^2$G, the same mixture of TFE, VdF and HFP as used in the initial stage was injected to repressurize to 20 kg/cm$^2$G and simultaneously, I(CF$_2$CF$_2$) I (3.8 g) was added as a chain transfer agent.

As the reaction proceeded, ammonium persulfate was consumed and the reaction rate decreased. Thus, a solution of ammonium persulfate (0.01–0.04 g) in pure water (10 ml) was injected together with nitrogen gas every 3 hours. With repeating decrease and increase of pressure, the polymerization was continued for 20 hours and 35 minutes.

After cooling the reaction vessel, the unreacted monomers were purged to give an aqueous emulsion with a solid content of 27.0% by weight.

To the emulsion, potash alum was added to coagulate the product, which was washed with water and dried to give an elastomeric copolymer (417 g). $^{19}$F- NMR analysis of the copolymer revealed that the molar ratio of TFE, VdF and HFP of the copolymer was 48:27:25 (weight ratio=46.4:11.9:41.7). The molar ratio obtained by the NMR analysis was substantially consistent with that calculated from the material balance.

EXAMPLE 2

In the same manner as in Example 1 but using a monomeric mixture of TFE, VdF and HFP in a molar ratio of 50:20:30 and 1.3 g of I(CF$_2$CF$_2$)I and continuing the polymerization for 18 hours and 45 minutes, polymerization was carried out to give an elastomeric copolymer (194 g) having a TFE/VdF/HFP molar ratio of 52:23:25 (weight ratio=49.9:14.3:36.0).

EXAMPLE 3

In the same manner as in Example 1 but using a monomeric mixture of TFE, VdF and HFP in a molar ratio of 38:27:35 and 4.8 g of I (CF$_2$CF$_2$)I and continuing the polymerization for 61 hours and 20 minutes, polymerization was carried out to give an elastomeric copolymer (469 g) having a TFE/VdF/HFP molar ratio of 40:30:30 (weight ratio=38.4:18.4:43.2).

EXAMPLE 4

In the same manner as in Example 1 but using a monomeric mixture of TFE, VdF and HFP in a molar ratio of 28:26:46 and 1.3 g of I(CF$_2$CF$_2$)I and continuing the polymerization for 26 hours and 25 minutes, polymerization was carried out to give an elastomeric copolymer (172 g) having a TFE/VdF/HFP molar ratio of 31:34:35 (weight ratio=29.4:20.7:49.9).

COMPARATIVE EXAMPLE 1

In the same manner as in Example 1 but using a monomeric mixture of TFE, VdF and HFP in a molar ratio of 17:53:30 and 1.3 g of I(CF$_2$CF$_2$)I and continuing the polymerization for 8 hours and 57 minutes, polymerization was carried out to give an elastomeric copolymer (172.8 g) having a TFE/VdF/HFP molar ratio of 14:54:32 (weight ratio=14.5:35.8:49.7).

COMPARATIVE EXAMPLE 2

In the same manner as in Example 1 but using a monomeric mixture of TFE, VdF and HFP in a molar ratio of 11:34:55 and 1.3 g of I(CF$_2$CF$_2$)I and continuing the polymerization for 40 hours and 35 minutes, polymerization was carried out to give an elastomeric copolymer (220.1 g) having a TFE/VdF/HFP molar ratio of 11:46:43 (weight ratio=10.5:28.1:61.4).

To the copolymer prepared in each of Examples and Comparative Examples, the components as shown in Table were added to prepare a curing composition and its curing properties were examined by means of a curastometer (JSR II type). The composition was only press cured at 160° C. for 10 minutes. Physical properties and volume resistivity of the cured composition were measured according to JIS K 6301 and JIS K 6911, respectively. Moldability of the cured composition was evaluated by extruding the uncured composition from a Koka-type flow tester (manufactured by Shimadzu) and observing the appearance of the extruded article. The results are shown in the Table, in which parts are by weight.

TABLE

| Example No. | 1 | 2 | 3 | 4 | Comp. 1 | Comp. 2 |
|---|---|---|---|---|---|---|
| Copolymer (parts) | 100 | 100 | 100 | 100 | 100 | 100 |
| Calcined clay (parts) | 30 | 30 | 30 | 30 | 30 | 30 |
| Triallyliso-cyanurate (parts) | 2.0 | 2.0 | 2.0 | 2.0 | 2.0 | 2.0 |
| Perhexa-2,5B (parts) | 1.5 | 1.5 | 1.5 | 1.5 | 1.5 | 1.5 |
| $v_{min}$ (kgf) | 0.10 | 0.37 | 0.01 | 0.04 | 0.08 | 0.02 |
| $v$ (kgf) | 3.97 | 4.35 | 4.03 | 2.86 | 3.42 | 2.08 |
| $T_{10}$ (min.) | 0.7 | 0.7 | 0.7 | 1.2 | 1.8 | 1.2 |
| $T_{90}$ (min.) | 2.4 | 1.2 | 1.7 | 5.2 | 8.6 | 5.2 |
| $M_{100}$ (kg/cm$^2$) | 102 | 114 | 91 | 36 | 31 | 28 |
| $T_B$ (kg/cm$^2$) | 212 | 202 | 243 | 147 | 122 | 122 |
| $E_B$ (%) | 280 | 280 | 290 | 470 | 440 | 540 |
| Hardness (JIS, Hs) | 89 | 95 | 84 | 71 | 74 | 70 |
| Volume resistivity (ohm · cm) | 3.3 × 10$^{15}$ | 1.3 × 10$^{15}$ | 8.5 × 10$^{15}$ | 1.1 × 10$^{15}$ | 6.9 × 10$^{13}$ | 1.4 × 10$^{14}$ |
| Moldability*$^1$ | O | O | O | O | X | X |

Note
*$^1$O: The extruded article had a smooth surface.
X: The extruded article had a rough surface.

What is claimed is:

1. A copolymer comprising repeating units derived from tetrafluoroethylene, vinylidene fluoride and hexafluoropropylene in a molar ratio within an area defined on a tetrafluoroethylene, vinylidene fluoride and hexafluoropropylene ternary composition diagram by a hexagon with,
   a first vertex A at 34.0% by weight of tetrafluoroethylene, 8.5% by weight of vinylidene fluoride and 57.5% by weight of hexafluoropropylene;
   a second vertex B at 26.5% by weight of tetrafluoroethylene, 14.5% by weight of vinylidene fluoride and 59.0% by weight of hexafluoropropylene;
   a third vertex C at 31.0% by weight of tetrafluoroethylene, 24.0% by weight of vinylidene fluoride and 45.0% by weight of hexafluoropropylene;
   a fourth vertex D at 49.0% by weight of tetrafluoroethylene, 26.5% by weight of vinylidene fluoride and 24.5% by weight of hexafluoropropylene;
   a fifth vertex E at 49.0% by weight of tetrafluoroethylene, 11.0% by weight of vinylidene fluoride and 40.0% by weight of hexafluoropropylene; and
   a sixth vertex F at 50.0% by weight of tetrafluoroethylene, 9.0% by weight of vinylidene fluoride and 41.0% by weight of hexafluoropropylene.
2. The copolymer according to claim 1, which has volume resistivity of at least 10$^{15}$ ohm.cm.
3. The copolymer according to caim 1, which has a number average molecular weight of 20,000 to 100,000.
4. An electric wire coated with a copolymer according to claim 1.
5. A wire coating material comprising the copolymer according to claim 1.
6. The copolymer according to claim 1, further comprising a pigment, a filler or a reinforcing material.

* * * * *